(12) United States Patent
Zhang et al.

(10) Patent No.: US 7,292,024 B2
(45) Date of Patent: Nov. 6, 2007

(54) DEFECT MITIGATION IN DISPLAY PANELS

(75) Inventors: Xuemei Zhang, Mountain View, CA (US); Feng Xiao, Sunnyvale, CA (US)

(73) Assignee: Avago Technologies ECBU IP (Singapore) PTE Ltd, Singapore (SG)

( * ) Notice: Subject to any disclaimer, the term of this patent is extended or adjusted under 35 U.S.C. 154(b) by 0 days.

(21) Appl. No.: 11/118,556

(22) Filed: Apr. 28, 2005

(65) Prior Publication Data

US 2006/0244476 A1    Nov. 2, 2006

(51) Int. Cl.
*G01R 31/00* (2006.01)
*G06K 9/00* (2006.01)

(52) U.S. Cl. .................... 324/158.1; 324/770

(58) Field of Classification Search ............ None
See application file for complete search history.

(56) References Cited

U.S. PATENT DOCUMENTS 5,504,504 A    4/1996   Markandey et al.
6,184,953 B1 *  2/2001   Greene et al. ............ 349/74
6,496,238 B1 * 12/2002  Greene et al. ............ 349/73

FOREIGN PATENT DOCUMENTS

| EP | 1536399      | 6/2005  |
| JP | 2003066924   | 5/2003  |
| WO | WO 91/15843  | 10/1991 |

OTHER PUBLICATIONS

Patent Application in Great Britain No. 0608395.0 Search Report dated Aug. 21, 2006.

* cited by examiner

*Primary Examiner*—Paresh Patel

(57) ABSTRACT

Defect mitigation in display panels. Defects in a display panel are mapped, and the defect information is associated with the display system or associated with the panel. During panel operation, the values of pixels neighboring defective pixels are altered to minimize their visibility to the observer. In a first model, luminance error caused by a defect is compensated by adjust neighboring pixels. In a second model, Error in luminance and one of the two chrominance channels is compensated by adjusting neighboring pixels. The defect mitigation methods seek to shift the errors introduced by defective pixels into high spatial frequency elements and chromatic elements, which the human eye is not sensitive to.

8 Claims, 2 Drawing Sheets

DEFECT MITIGATION IN DISPLAY PANELS

TECHNICAL FIELD

Embodiments in accordance with the invention are related to display panels, and more specifically, to defect mitigation in display panels.

BACKGROUND

Flat panel displays are quickly becoming a dominant display technology. They range from liquid crystal (LCD) RGB displays, to plasma displays, to light emitting diode (LED) and organic light emitting diode (OLED) displays, projection displays using single or multiple LCD elements, and single or multiple micro-mirror elements.

A common problem shared by these technologies is yield. Perfect panels are very difficult to produce, and are very expensive. Pixel defects in LCD panels include stuck-on and stuck-off pixels. Typically, some number of defective pixels are allowed on a display panel. An ISO standard for pixel defects, ISO 13406-2, identifies three classes of standards for measuring pixel defects in flat panel displays. The most lenient class still only permits five full-brightness pixels, 15 full dark pixels, and 50 sub-pixel defects for a 15 or 17-inch panel. Most data displays strive to satisfy the Class 2 standard or better. This means that even for a process which has a very low defect rate per pixel, the probability of having a Class 3 panel of 1024×768 resolution is still quite low. With the resolution requirement of high definition television (HDTV, 1920×1080), pixel defect can severely limit yield and drive up the cost of good panels.

An approach to mitigate pixel defects could improve overall yields and influence price.

SUMMARY OF THE INVENTION

Defect mitigation in display panels is accomplished by mapping pixel defects in panels, associating this defect information with the panel, and using this defect information in panel operation to alter the values of neighboring pixels to make defective pixels less visible to the observer.

DETAILED DESCRIPTION

Figure 1:
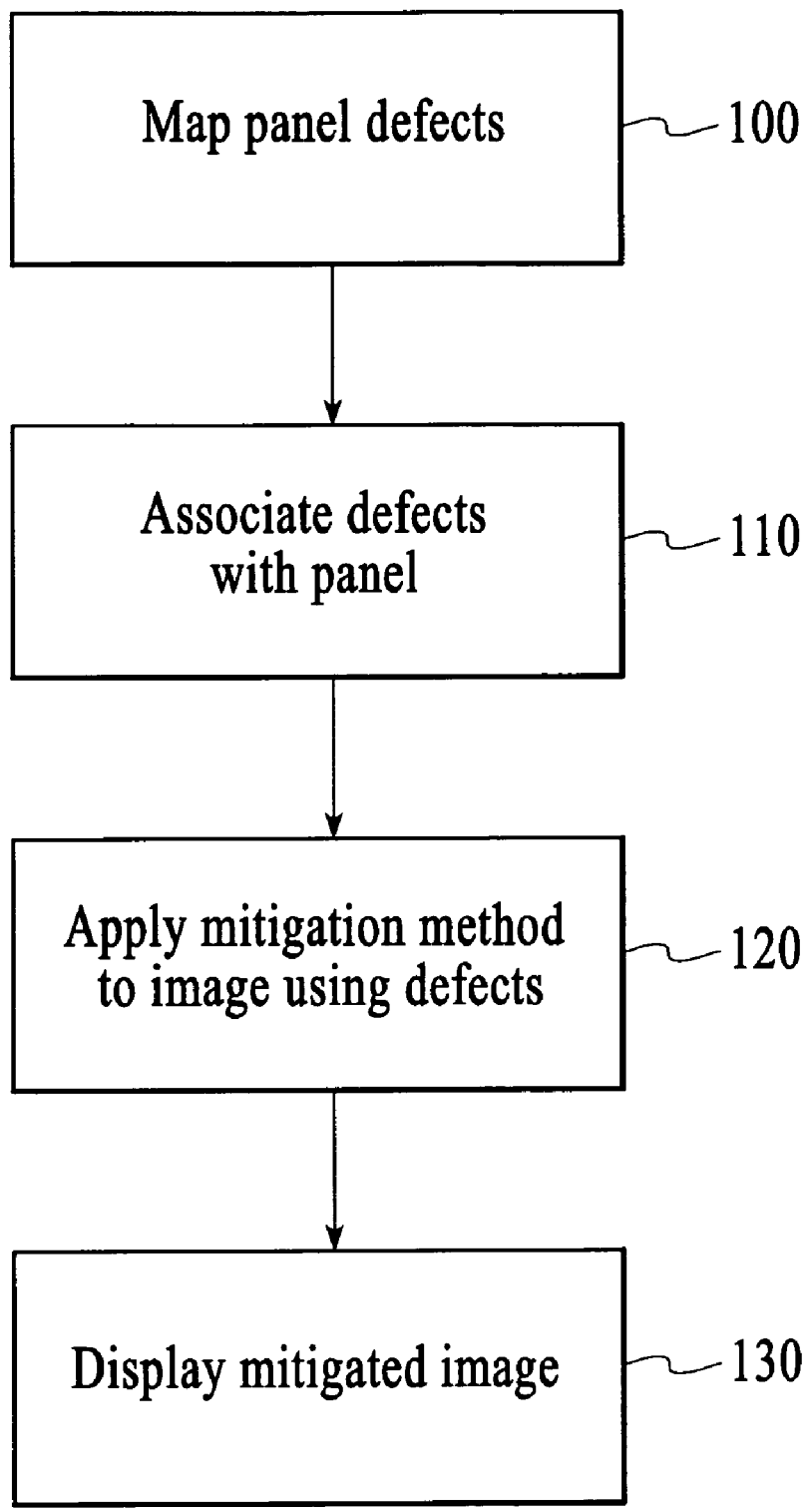
FIG. 1 shows a flowchart of defect mitigation.

In accordance with the present invention, and as shown in the flowchart of FIG. 1, a display panel is first mapped 100 for defects. This mapping may be accomplished by completely automatic methods, as an example, by using test pattern generation coupled with image sensing to detect the presence or absence of pixels. The mapping may also be accomplished in a semi-automatic manner in which a human operator assists the defect mapping process. The result of the defect mapping is a data set identifying faulty pixels. Pixels are identified by location, and the nature of the fault, which at a minimum is stuck on or stuck off. Optionally, information such as pixel luminance may be recorded to identify defective pixels which turn partially on or off. With color panels, such as RGB panels, the luminance and chromaticity of the panel's primary colors are recorded for use in the defect correction models.

The accumulated data set identifying faulty pixels in a panel is associated 110 with the panel. This may be accomplished by storing the defect information on a memory device associated with the panel, such as in a memory device mounted in the panel or its control circuitry. The defect information may also be associated with the panel through use of serial numbers, bar coding, or the like, so that this defect information may be provided to correction circuitry or software during panel operation.

With respect to RGB display panels, one set of defect information is associated for each of Red, Green, and Blue. Examples would include an RGB liquid crystal display (LCD), or separate panels used for red, green, and blue in an LCD projection display. Where a single display panel is used, such as in a micromirror display which is coupled with a spinning color wheel, generating successive red, green, and blue images in rapid succession, only one set of defect values need be stored, as each defective pixel in the micromirror display will present itself in each of the red, green, and blue images.

In operation according to the present invention, the defect information is used to alter pixels in the neighborhood of defective pixels so as to make the defective pixels less noticeable to observers. This compensation step is a preprocessing step taken prior to displaying an image on the display panel. It may be provided as image processing hardware included with the display panel or display panel set where multiple panels are used, storing the defect information and processing input images to form corrected images. It may be provided in software form, using the defect information to apply a mitigation method to an image 120 such as an image in a frame buffer, and displaying the mitigated image 130. This process is repeated on a frame-by frame basis.

Many different models may be used in this mitigation process to smooth out or diffuse the effect of the defective pixel by modifying its surrounding neighbors. Adaptive methods may be used, which determine the surrounding pixel values by taking into account the actual image content in the area. Fixed defect diffusion patterns similar to halftone masks applicable to each type of defect may require less processing.

Figure 2:
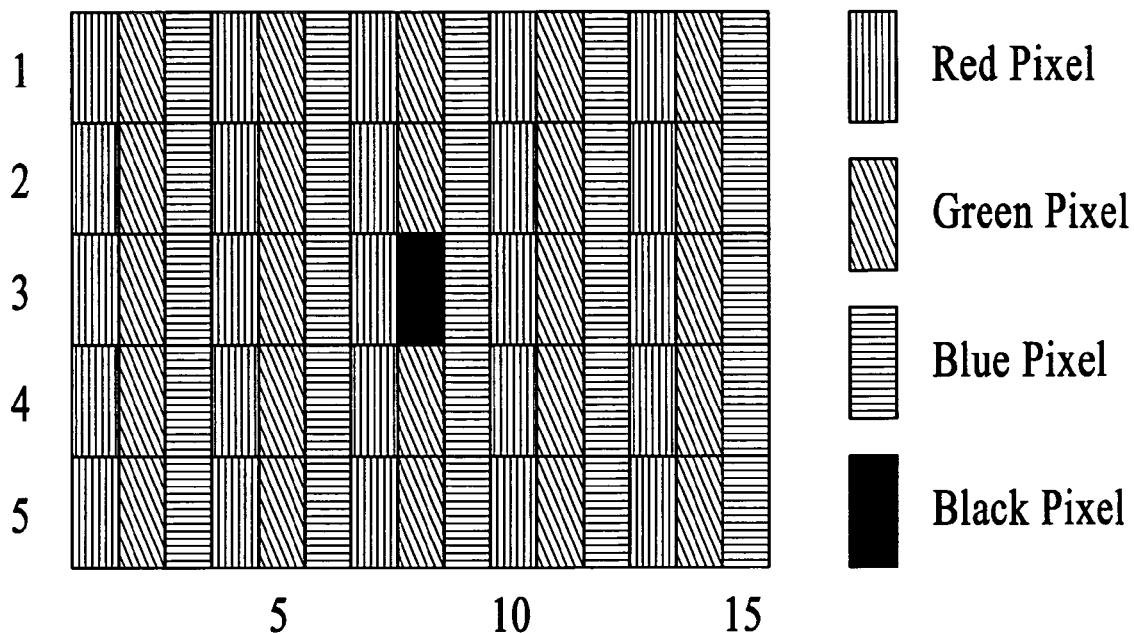
FIG. 2 shows a pixel defect.
Figure 3:
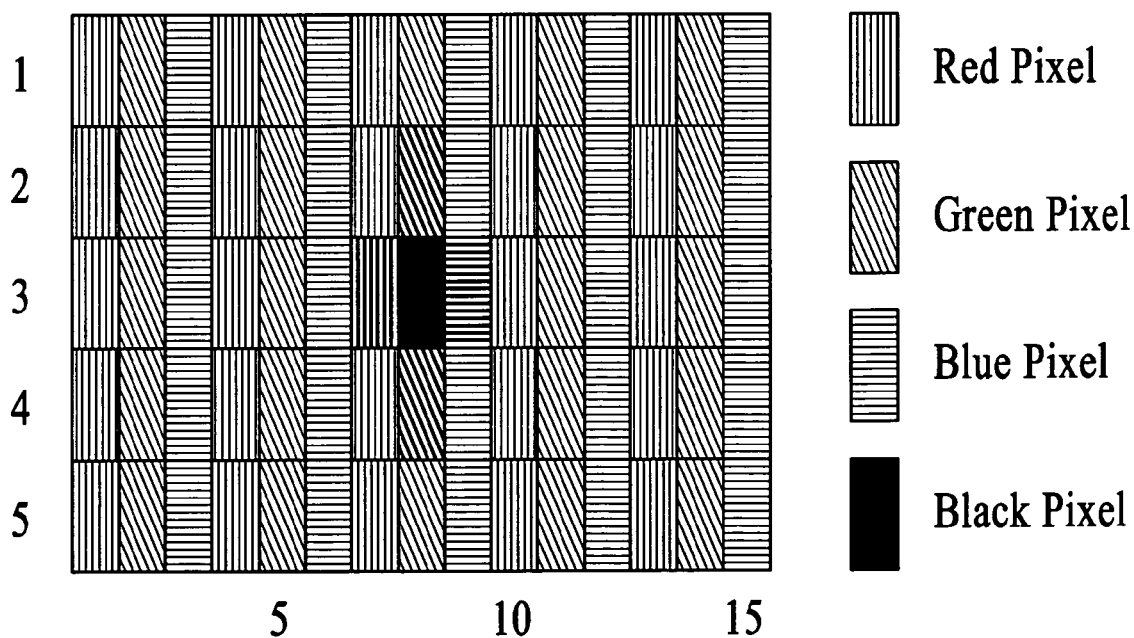
FIG. 3 shows pixel correction.

In a first defect diffusion method, the luminance error introduced by the defective pixel, whether stuck on or stuck off in a simple case, or producing an incorrect luminance value in more complex cases, is compensated by decreasing or increasing the values of neighboring pixels. This effectively reduces the low frequency element of the error while adding to the high frequency element of the error. Because of the low-pass nature of the human visual system, the compensated pattern will be less visible to the eye. FIG. 2 shows an example of a stuck off green subpixel at column 8 row 3 in an image. In an integrated RGB display, each pixel is comprised of red, green, and blue subpixels. FIG. 3 shows an example of a defect compensation pattern applied to the image. Note that the intensities of surrounding red, green, and blue subpixels have been altered so that the local average luminance now better represent the desired luminance level of the image. Surrounding pixel values may be increased or decreased according to the compensation pattern used. As shown in FIG. 3, the red subpixel to the immediate left (column 7 row 3) of the stuck-off green subpixel is increased in intensity. Neighboring blue pixels in columns 6 and 9 of row 3 are also intensified, as are adjoining green subpixels in column 8. As the effects of the compensation pattern propagate away from the defect, subpixel intensities may be reduced, as shown in the blue subpixel at column 12 row 3, and the red and blue subpixels in columns 6 and 7 row 2 and columns 6 and 7 row 4. This method reduces perceived luminance error but may introduce more chrominance error, which the human eye is less sensitive to. Other correction methods could be limited to changing the levels of only neighboring pixels of the same color as the defective pixel. While the image of FIG. 3 may look no better than the image of FIG. 2 at the magnified resolution shown here, at a normal viewing distance and pixel size the result is a pattern in which the defective pixel is less visible to the human eye. Typically these methods will reduce the value of pixels surrounding a bright defect, and increase the value of pixels surrounding a dark defect.

A basic correction model may seek to compensate only for luminance errors introduced by defective pixels, while leaving the chromatic errors in place, since small region chrominance errors are less visible than luminance errors. With two chromatic channels that can be modified, this allows maximum flexibility in luminance error minimization. More advanced models may seek to compensate for luminance error while minimizing the error at one of the two chromatic channels, usually the red-green channel. Usually it is not desirable to try to minimize local error in all color channels, as it will likely lead to more visible spatial error.

For most image contents, defect diffusion methods are quite effective in reducing the visibility of defects. The worst case will be stuck on pixels on a completely dark background, which are very difficult to correct using diffusion methods.

The invention claimed is:

1. A method of defect mitigation in display panels comprising:

mapping defective pixels in a display panel, including identifying always-on and always-off pixels as some of the defective pixels, associating the mapped defective pixels with the display panel, and altering the image displayed on pixels surrounding the mapped defective pixels based on a correction model, including changing values of the pixels surrounding a particular defective pixel such that the values of the pixels that are immediately adjacent to the particular defective pixel are changed by a greater amount than the values of the pixels that are further away from the particular defective pixel.

2. The method of claim 1 where the altering includes compensating for a luminance error of each of the defective pixels using surrounding pixel value changes.

3. The method of claim 1 where the altering includes compensating for a luminance error and one of two channels of chromatic error of each of the defective pixels using surrounding pixel value changes.

4. The method of claim 1 where the mapping includes recording defect information, the defect information comprising pixel location and defect type.

5. The method of claim 4 where the defect information recorded comprises at least pixel locations and display gamma, and chromaticity of the primaries.

6. The method of claim 4 where the defect information recorded comprises at least pixel locations, pixel luminance, and pixel chrominance.

7. The method of claim 1 where the altering includes altering only pixel values of neighboring pixels of each mapped defective pixel.

8. The method of claim 7 where the altering only the pixel values of the neighboring pixels includes altering only the pixel values of the neighboring pixels of the same color as the each mapped defective pixel.

* * * * *